(12) United States Patent
Kuretake et al.

(10) Patent No.: US 8,674,310 B2
(45) Date of Patent: Mar. 18, 2014

(54) LIGHT EMITTING CERAMIC, LIGHT EMITTING ELEMENT, SCINTILLATOR, AND METHOD FOR PRODUCING LIGHT EMITTING CERAMIC

(71) Applicant: Murata Manufacturing Co., Ltd., Nagaokakyo (JP)

(72) Inventors: Satoshi Kuretake, Nagaokakyo (JP); Takeshi Hayashi, Nagaokakyo (JP)

(73) Assignee: Murata Manufacturing Co., Ltd., Nagaokakyo-shi, Kyoto-Fu (JP)

( * ) Notice: Subject to any disclaimer, the term of this patent is extended or adjusted under 35 U.S.C. 154(b) by 0 days.

(21) Appl. No.: 13/688,298

(22) Filed: Nov. 29, 2012

(65) Prior Publication Data

US 2013/0105697 A1    May 2, 2013

Related U.S. Application Data

(63) Continuation of application No. PCT/JP2011/060866, filed on May 11, 2011.

(30) Foreign Application Priority Data

Jun. 17, 2010  (JP) .................. 2010-138254
Sep. 24, 2010  (JP) .................. 2010-214203

(51) Int. Cl.
   *G01T 1/20*    (2006.01)
(52) U.S. Cl.
   USPC ..................................... 250/361 R
(58) Field of Classification Search
   USPC ..................................... 250/361 R
   See application file for complete search history.

(56) References Cited

U.S. PATENT DOCUMENTS

| 4,958,080 | A | 9/1990 | Melcher |
| 7,898,665 | B2 * | 3/2011 | Brukilacchio et al. ........ 356/417 |
| 8,034,468 | B2 | 10/2011 | Hayashi |
| 2008/0213151 | A1 | 9/2008 | Yoshikawa et al. |
| 2008/0233406 | A1 * | 9/2008 | Hayashi ........................ 428/426 |
| 2010/0207031 | A1 * | 8/2010 | Leppert ......................... 250/368 |

FOREIGN PATENT DOCUMENTS

| JP | 02-225587 A | | 9/1990 |
| JP | 2989184 B1 | | 12/1999 |
| JP | 2008-174432 | * | 7/2008 |
| WO | WO-2006049284 A1 | | 5/2006 |
| WO | WO-2007060816 A1 | | 5/2007 |

OTHER PUBLICATIONS

International Search Report and Written Opinion issued in PCT/JP2011/060866, mailed Aug. 2, 2011.

(Continued)

*Primary Examiner* — David Porta
*Assistant Examiner* — Mindy Vu
(74) *Attorney, Agent, or Firm* — Dickstein Shapiro LLP

(57) ABSTRACT

Provided is a light emitting ceramic such as a wavelength conversion ceramic or a radiation-to-light conversion ceramic, which emits light when radiation or light enters the ceramic, and which has a short light emission decay time. The light emitting ceramic is obtained by applying a heat treatment in a reducing atmosphere to a ceramic containing, as its main constituent, a pyrochlore compound represented by $ABO_w$ where A includes at least one of La, Y, Gd, Yb, and Lu, and 0 to 5 mol % of Bi; B is at least one of Sn, Zr, and Hf; and w is a positive number for maintaining electroneutrality.

22 Claims, 3 Drawing Sheets

(56) References Cited

OTHER PUBLICATIONS

A.M. Srivastava et al.; "On the Impurity trapped excitation luminescence in La2Zr2O7:Bi3+"; Journal of Luminescence, 1999, 81, pp. 293 to 300.

A.M. Srivastava et al.; "On the luminescence of Bi3+ in the pyrochlore Y2Sn2O7"; Materials Research Bulletin, 2002, 37, pp. 745 to 751.

R.A. McCauley, et al; "Luminescence as an indication of distortion in A3+2B4+2O7 type pyrochlores"; Journal of Luminescence, 1973, 6, pp. 105 to 115.

Yuanabing Mao, et al.; "Luminescent nanocrystals with A2B2O7 composition synthesized by a kinetically modified molten salt method"; Journal of Physical Chemistry C, 2009, 113, pp. 1204 to 1208.

Aiyu Zhang, et al. "Systematic research on RE2Zr2O7 (RE=La, Nd, Eu and Y) nanocrystals: Preparation, structure and photoluminescence characterization"; Solid State Science, 2008, 10, pp. 74 to 81.

Yuping Tong, et al.; "Preparation and characterization of pyrochlore La2Zr2O7 nanocrystals by stearic acid method"; Materials Letters, 2008, 62, pp. 889 to 891.

* cited by examiner

LIGHT EMITTING CERAMIC, LIGHT EMITTING ELEMENT, SCINTILLATOR, AND METHOD FOR PRODUCING LIGHT EMITTING CERAMIC

This is a continuation of application Serial No. PCT/JP2011/060866, filed May 11, 2011, the entire contents of which are incorporated herein by reference.

TECHNICAL FIELD

The present invention relates to a light emitting ceramic, a light emitting element and a scintillator using the ceramic, and a method for producing the light emitting ceramic. In particular, the present invention relates to a light emitting ceramic such as a radiation-to-light conversion ceramic and a wavelength conversion ceramic, a light emitting element such as a radiation-to-light conversion element and a wavelength conversion element, a scintillator, and a method for producing the light emitting ceramic such as a radiation-to-light conversion ceramic and a wavelength conversion ceramic.

BACKGROUND ART

Conventionally, various light emitting elements have been known which emit light when radiation or light enters the elements. Specific examples of such light emitting elements include, for example, wavelength conversion elements which emit light of a longer wavelength than that of incident ultraviolet light when ultraviolet light or the like enters the elements, and radiation-to-light conversion elements which emit fluorescence when radiation enters the elements.

For example, radiation-to-light conversion elements are used for scintillators which are radiation detectors. The radiation-to-light conversion elements for use in scintillators, etc. are required to be high in luminescent efficiency and short in emission decay time, in order to increase the spatial resolutions and temporal resolutions of the scintillators. Examples of the radiation-to-light conversion elements which satisfy these requirements include radiation-to-light conversion elements which use a single crystalline material as described in, for example, Patent Documents 1 and 2 below.

In addition, Patent Document 3 below discloses a ceramic scintillator containing an oxysulfide or an oxide containing a rare earth.

PRIOR ART DOCUMENTS

Patent Documents

Patent Document 1: WO 2006/049284 A1
Patent Document 2: Japanese Patent Application Laid-Open No. 2-225587
Patent Document 3: Japanese Patent No. 2989184
Patent Document 4: WO 2007/060816 A1

DISCLOSURE OF THE INVENTION

Problem to be solved by the invention

However, it is difficult to produce the single crystalline radiation-to-light conversion materials as described in Patent Documents 1 and 2, and the materials thereof have the problem of difficulty in processing into radiation-to-light elements because of having crystalline anisotropy.

On the other hand, the ceramic scintillator described in Patent Document 3 can be produced more easily than the single crystalline radiation-to-light conversion materials, and is easily processed into radiation-to-light elements, because the scintillator is ceramic. However, the emission decay time in the case of a rare earth as the luminescent center is generally on the order of several hundreds μseconds to several mseconds, and there is a problem that it is difficult to sufficiently shorten the emission decay time.

Therefore, there has been a need for radiation-to-light conversion ceramics which are easily produced, and short in light emission decay time.

Likewise for wavelength conversion materials which emit light of a longer wavelength than incident light, when light such as, for example, ultraviolet light enters the materials, there has been a need for materials which include easily produced ceramics, and short in light emission decay time.

The present invention has been achieved in view of these respects, and an object of the present invention is to provide a light emitting ceramic such as a wavelength conversion ceramic or a radiation-to-light conversion ceramic which emits light when radiation or light enters the ceramic, and which is short in light emission decay time.

Further, Patent Document 4 discloses a light transmitting ceramic containing, as its main constituent, a pyrochlore compound of an oxide containing at least one of La, Y, Gd, Yb, and Lu, and at least one of Ti, Sn, Zr, and Hf, and having the main constituent in the cubic crystal system. However, the light-transmitting ceramic disclosed in Patent Document 4 emits substantially no light when the ceramic is irradiated with radiation or light. Therefore, the light-transmitting ceramic disclosed in Patent Document 4 fails to correspond to a light emitting ceramic.

Means for Solving the Problem

A first light emitting ceramic according to the present invention is obtained by applying a heat treatment in a reducing atmosphere to a ceramic containing, as its main constituent, a pyrochlore compound represented by $ABO_w$ (where A includes at least one selected from the group consisting of La, Y, Gd, Yb, and Lu, and 0 to 5 mol % of Bi; B is at least one selected from the group consisting of Sn, Zr, and Hf; and w is a positive number for maintaining electroneutrality).

In a specific aspect of the first light emitting ceramic according to the present invention, the ceramic having a thickness of 1 mm has a light transmission of 40% or more at a wavelength of 450 nm to 800 nm.

In another specific aspect of the first light emitting ceramic according to the present invention, the emission quantum yield is 3% or more, which is obtained when the light emitting ceramic is irradiated with excitation light.

In still another specific aspect of the first light emitting ceramic according to the present invention, A includes at least one of La and Y, and 0 to 5 mol % of Bi, and B includes Zr.

In yet another specific aspect of the first light emitting ceramic according to the present invention, a light emitting ceramic of 1 mm in thickness has a light transmission of 75% or more at a wavelength of 450 nm to 800 nm, and the emission quantum yield is 10% or more, which is obtained when the light emitting ceramic is irradiated with excitation light.

It is to be noted that the "emission quantum yield" in the present invention refers to the ratio of the total number of photons emitted from a sample to the total number of photons absorbed by the sample.

In yet another specific aspect of the first light emitting ceramic according to the present invention, A contains 0.001 mol % or more of Bi.

In a further specific aspect of the first light emitting ceramic according to the present invention, the emission quantum yield is 10% or more, which is obtained when the light emitting ceramic is irradiated with excitation light.

Another specific aspect of the first light emitting ceramic according to the present invention, A includes La, and 0.001 mol % to 5 mol % of Bi, and B is at least one of Zr and Hf.

In yet another specific aspect of the first light emitting ceramic according to the present invention, A includes Gd, and 0.001 mol % to 5 mol % of Bi, and B is Hf.

In a further specific aspect of the first light emitting ceramic according to the present invention, the light emitting ceramic of 1 mm in thickness has a light transmission of 70% or more at a wavelength of 450 nm to 800 nm, and the emission quantum yield is 15% or more when the light emitting ceramic is irradiated with excitation light.

A second light emitting ceramic according to the present invention contains, as its main constituent, a pyrochlore compound represented by $ABO_w$ (where A includes at least one of La and Y, and 0 to 5 mol % of Bi; B is Zr; and w is a positive number for maintaining electroneutrality). A second light emitting ceramic according to the present invention which is 1 mm in thickness has a light transmission of 75% or more at a wavelength of 450 nm to 800 nm.

In a specific aspect of the second light emitting ceramic according to the present invention, the emission quantum yield is 10% or more when the light emitting ceramic is irradiated with excitation light.

A third light emitting ceramic according to the present invention contains, as its main constituent, a pyrochlore compound represented by $ABO_w$ (where A includes La, and 0.001 mol % to 5 mol % of Bi; B is at least one of Zr and Hf; and w is a positive number for maintaining electroneutrality). A third light emitting ceramic according to the present invention which is 1 mm in thickness has a light transmission of 70% or more at a wavelength of 450 nm to 800 nm.

A fourth light emitting ceramic according to the present invention contains, as its main constituent, a pyrochlore compound represented by $ABO_w$ (where A includes Gd, and 0.001 mol % to 5 mol % of Bi; B is Hf; and w is a positive number for maintaining electroneutrality). A fourth light emitting ceramic according to the present invention which is 1 mm in thickness has a light transmission of 70% or more at a wavelength of 450 nm to 800 nm.

In a specific aspect of the third or fourth light emitting ceramic according to the present invention, the emission quantum yield is 15% or more when the light emitting ceramic is irradiated with excitation light.

In another specific aspect of the first to fourth light emitting ceramics according to the present invention, the light emitting ceramic is a wavelength conversion ceramic which emits light of a longer wavelength than incident light.

The wavelength conversion ceramic may convert incident light to ultraviolet light, visible light, infrared light, X ray, or gamma ray. In addition, the wavelength conversion ceramic may convert outgoing light to ultraviolet light, visible light, infrared light, X ray, or gamma ray. Specific examples of the wavelength conversion ceramic include an ultraviolet-visible light conversion ceramic, a visible light-visible light conversion ceramic, a visible light-infrared light conversion ceramic, an X-ray-visible light conversion ceramic, and a gamma ray-visible light conversion ceramic.

It is to be noted that the "visible light" refers to light of a wavelength in the range of 400 nm to 800 nm in the present invention. The "ultraviolet light" refers to light of a wavelength in the range of 240 nm to 400 nm. The "infrared light" refers to light of a wavelength in the range of 800 nm to 2500 nm.

In yet another specific aspect of the first to fourth light emitting ceramics according to the present invention, the light emitting ceramic is a radiation-to-light conversion ceramic which emits light when radiation enters the ceramic. The radiation includes an alpha ray, a beta ray, neutron, gamma ray, and X ray.

A light emitting element according to the present invention includes the first to fourth light emitting ceramics according to the present invention.

A scintillator according to the present invention includes the light emitting ceramic according to the present invention, and a detector for detecting light emitted from the light emitting element. The light emitting ceramic is a radiation-to-light conversion ceramic which emits light when radiation enters the ceramic.

In a method for producing a light emitting ceramic according to the present invention, wherein the light emitting ceramic is obtained by applying a heat treatment in a reducing atmosphere to a ceramic containing, as its main constituent, a pyrochlore compound represented by $ABO_w$ (where A includes at least one selected from the group consisting of La, Y, Gd, Yb, and Lu, and 0 to 5 mol % of Bi; B is at least one selected from the group consisting of Sn, Zr, and Hf; and w is a positive number for maintaining electroneutrality).

In a specific aspect of the method for producing a light emitting ceramic according to the present invention, A contains 0.001 mol % or more of Bi.

Advantageous Effect of the Invention

According to the present invention, a light emitting ceramic such as a wavelength conversion ceramic or a radiation-to-light conversion ceramic can be provided, which emits light when radiation or light enters the ceramic, and which is short in light emission decay time.

BEST MODE FOR CARRYING OUT THE INVENTION

A preferred embodiment in the practice of the present invention will be described below with reference to a scintillator 1 illustrated in FIG. 1 as an example. However, the scintillator 1 is just an example. The scintillator according to the present invention is not limited to the scintillator 1 in any way. In addition, the light emitting ceramic and the production method therefor, as well as the light emitting element according to the present invention are also not limited to a light emitting ceramic and a production method therefor, as well as a light emitting element described in the present embodiment in any way.

Figure 1:
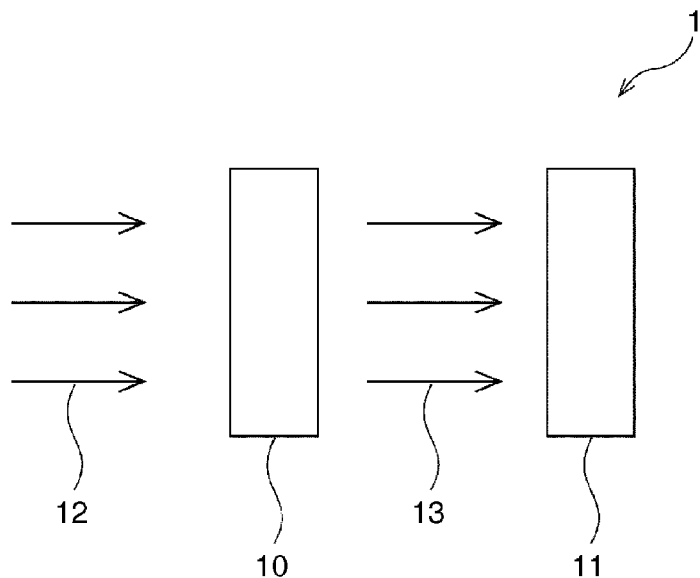
FIG. 1 is a schematic illustration of a scintillator according to an embodiment in the practice of the present invention.

FIG. 1 is a schematic illustration of the scintillator according to the present embodiment.

As illustrated in FIG. 1, the scintillator (radiation detector) 1 includes a light emitting element 10 and a detector 11.

In the present embodiment, the light emitting element 10 is an element which emits light (specifically, visible light) 13 of intensity in response to the intensity of incident radiation 12 when the radiation 12 enters the element. The light emitting element 10 and the detector 11 are arranged so that light 13 emitted from the light emitting element 10 enters the detector 11. The detector 11 detects the intensity of the incident light 13.

Here, as described above, the light emitting element 10 is an element which emits the light 13 of intensity in response to the intensity of the incident radiation 12. For this reason, the intensity of the light 13 detected by the detector 11 is correlated with the intensity of the radiation 12. Therefore, the intensity of the radiation 12 is detected in the detector 11 in an indirect manner.

It is to be noted that detector 11 can include, for example, a photomultiplier or a photodiode.

In the present embodiment, the light emitting element 10 is a light emitting ceramic containing, as its main constituent, a pyrochlore compound represented by $ABO_w$ (where A includes at least one selected from the group consisting of La, Y, Gd, Yb, and Lu, and 0 to 5 mol % of Bi; B is at least one selected from the group consisting of Sn, Zr, and Hf; and w is a positive number for maintaining electroneutrality). This light emitting ceramic has a short light emission decay time of, for example, 20 μseconds or less. For this reason, the use of the light emitting element 10 including the light emitting ceramic can achieve the high-resolution scintillator 1.

In addition, the light emitting ceramic is a ceramic, and thus easily produced as compared with, for example, a single-crystalline light emitting material, and the light emitting element 10 is also easily produced.

Furthermore, this light emitting ceramic has a high density of, for example, 6 g/cm³ or more, and thus has a high radiation absorbing capability.

It is to be noted that the ceramic containing, as its main constituent, a pyrochlore compound represented by $ABO_w$ (where A is at least one selected from the group consisting of La, Y, Gd, Yb, and Lu; B is at least one selected from the group consisting of Sn, Zr, and Hf; and w is a positive number for maintaining electroneutrality) is not considered to function as a light emitting ceramic immediately after being subjected to firing. When this ceramic is subjected to a heat treatment in a reducing atmosphere, the light emitting ceramic is obtained.

In the light emitting ceramic, w is a positive number for maintaining electroneutrality, and for example, 3.5. More specifically, specific examples of $ABO_w$ include, for example, $A_2B_2O_7$.

From the standpoint of increasing the amount of light emitted from the light emitting ceramic, the light transmission of the light emitting ceramic is preferably high. More specifically, the light transmission is preferably high at the emission wavelength of the light emitting ceramic. This is because the extraction efficiency from the light emitting ceramic increases for light emission in the light emitting ceramic in this case. Specifically, when the light emitting ceramic is 1 mm in thickness, the light transmission is 40% or more at a wavelength of 450 nm to 800 nm, more preferably 70% or more, and even more preferably 75% or more.

In addition, A preferably includes at least one of La and Gd, and B preferably includes at least one of Zr and Hf from the standpoint of increasing the light transmission of the light emitting ceramic. Furthermore, A preferably includes at least one of La and Gd at 80 mol % or more, and B preferably includes at least one of Zr and Hf. In addition, at least one of Y and Bi is preferably included in A in addition to La and Ga.

Further, the emission quantum yield of the light emitting ceramic is preferably high from the standpoint of increasing the amount of light emitted from the light emitting ceramic. Specifically, the emission quantum yield obtained when the light emitting ceramic is irradiated with excitation light is preferably 3% or more, more preferably 10% or more, and even more preferably 15% or more.

From the standpoint of increasing the emission quantum yield of the light emitting ceramic, A preferably includes Bi, more preferably 0.001 mol % or more of Bi, and even more preferably 0.01 mol % or more of Bi. The content rate of Bi in A is preferably 0.5 or less, more preferably 0.4 or less, and even more preferably 0.3 or less.

More specifically, the light emitting ceramic is more preferably the following (1) to (2):

(1)

A: including at least one of La and Y and 0 to 5 mol % of Bi

B: including at least one of Zr and Hf

In this case of (1), B more preferably includes Zr when A includes no Bi.

On the other hand, A more preferably includes La and Bi when A includes Bi in the case of (1). The lower limit of the content rate of Bi in A is preferably 0.001 mol %, more preferably 0.01 mol %, and more preferably 0.1 mol %. The upper limit of the content rate of Bi in A is preferably 0.05 mol %, and more preferably 0.03 mol %.

(2)

A: including Gd and 0 to 5 mol % of Bi

B: including Hf

In the case of (2), the lower limit of the content rate of Bi in A is preferably 0.001 mol %, and more preferably 0.01 mol %. The upper limit of the content rate of Bi in A is preferably 0.05 mol %, and more preferably 0.03 mol %.

It is to be noted that the following reason is considered as the reason why the light emitting ceramic is obtained when the ceramic $ABO_w$ is subjected to a heat treatment in a reducing atmosphere. More specifically, a large number of holes are considered to be generated in the preparation of the ceramic $ABO_w$ by firing as a result of the generation of defective metal atoms or the change in valence of metal atom. The heat treatment of the ceramic $ABO_w$ in a reducing atmosphere is considered to supply electrons to the holes from the oxygen sites before the reduction, thereby neutralizing the holes. Then, the formation of an acceptor level by the oxygen vacancies stripped of electrons is considered to cause the ceramic to emit light. More specifically, when the acceptor level is formed, excited electrons excited by the delivery of radiation are considered to be trapped in the acceptor level, and then deactivated to emit light.

Although it is not known exactly why the Bi contained in A increases the emission quantum yield of the light emitting ceramic, the increase of the electron transition probability in light emissions from donor-acceptor pairs or the decrease of the non-radiation transition probability from the excitation level is considered to be caused due to the generation of a new electron level with the Bi ion substitution, the increase in defect level with the volatilization of Bi ions which have a high vapor pressure, or the like, thereby resulting an increase in the emission quantum yield of the light emitting ceramic.

It is to be noted that while a case of adopting as the light emitting element 10, the radiation-to-light conversion element which emits light by the delivery of radiation as described in the present embodiment, the light emitting ceramic constituting the light emitting element 10 also functions as a wavelength conversion ceramic which emits light of a longer wavelength than incident light. Specifically, the light emitting ceramic according to the present embodiment emits visible light of a longer wavelength than ultraviolet light when ultraviolet enters the ceramic. For this reason, the use of the light emitting ceramic according to the present embodiment also makes it possible to prepare a wavelength conversion element.

Next, a method for producing the light emitting ceramic according to the present embodiment will be described.

First, a ceramic raw material powder is formed into a predetermined shape to form an unfired ceramic compact. Next, the unfired ceramic compact is subjected to firing in an atmosphere containing oxygen, thereby preparing a ceramic $ABO_w$. The firing atmosphere for the ceramic $ABO_w$ preferably has an oxygen concentration of 98 vol % or more. The firing temperature (maximum temperature) can be, for example, on the order of 1500° C. to 1800° C. The retention time at the firing temperature (maximum temperature) in the firing step can be, for example, on the order of 5 hours to 100 hours.

Next, the obtained ceramic $ABO_w$ is subjected to a heat treatment (reducing heat treatment) in a reducing atmosphere, thereby preparing a light emitting ceramic. The reducing atmosphere for the heat treatment of the ceramic $ABO_w$ may be, for examples, a $H_2/H_2O$ atmosphere. The heat treatment temperature (maximum temperature) for the ceramic $ABO_w$ is preferably, for example, 800° C. to 1200° C., and more preferably 900° C. to 1100° C. In addition, the retention time at the heat treatment temperature (maximum temperature) for the ceramic $ABO_w$ can be, for example, on the order of 1 hour to 100 hours.

It is to be noted that the light transmission of the ceramic $ABO_w$ at a wavelength of 450 nm to 800 nm is improved by the heat treatment. This is conceived to be because holes generated in the preparation of the ceramic $ABO_w$ by firing, which serve as color centers to absorb light of a short wavelength such as a wavelength of 450 nm to 800 nm as described above, are neutralized by the reduction annealing described above.

It is to be noted that while the light emitting ceramic in the present embodiment is represented by $ABO_w$ logically as described above, the molar ratio between A and B (A:B) is not to be considered strictly limited to 1:1. In the present invention, the light emitting ceramic $ABO_w$ is supposed to include light emitting ceramics with the molar ratio of A to B (A/B) from 0.95 to 1.05.

The main constituent of the light emitting ceramic in the present embodiment may have a cubic crystal system.

In addition, while the light emitting ceramic in the present embodiment is represented by $ABO_w$, the ceramic may include inevitably mixed impurities (hereinafter, referred to as "inevitable impurities"), besides the A, B, and O constituents. Specific examples of the inevitable impurities include $SiO_2$, $B_2O_3$, and $Al_2O_3$.

EXPERIMENTAL EXAMPLE

First, high-purity $La(OH)_3$, $Y_2O_3$, $Yb_2O_3$, $Lu_2O_3$, $Gd_2O_3$, $ZrO_2$, $HfO_2$, $SnO_2$, and $Bi_2O_3$ were prepared as raw materials. These raw materials were weighed for the compositions in Tables 1 and 2 below, and subjected to wet mixing for 20 hours in a ball mill. The obtained mixture was subjected to drying, and then to calcination at 1300° C. for 3 hours to obtain a calcined product. This calcined product was put in a ball mill along with water and an organic dispersant, and then subjected to wet grinding for 12 hours. With the use of this ground product, a disk shape of 30 mm in diameter and 5 mm in thickness was formed by wet molding.

Next, the compact was buried in a powder of the same composition, and subjected to firing at a temperature of 1700° C. for 20 hours under an oxygen atmosphere (oxygen concentration: approximately 98%) to obtain a sintered body. The density of the sintered body obtained was measured by the Archimedes method. The results are shown in Tables 1 and 2 below.

Thereafter, the both surfaces of the sintered body were subjected to mirror polishing so as to serve as a substrate of 1.0 mm in thickness, and the substrate was then cut in half. Next, one of the half substrates was subjected to a heat treatment in a $H_2/H_2O$ reducing atmosphere (oxygen partial pressure: $1\times10^{-15}$ MPa) to prepare an evaluation sample, whereas the other was used as an evaluation sample before the heat treatment. The maximum temperature of the heat treatment was adjusted to 1000° C., and the retention time at 1000° C. was adjusted to 3 hours.

Figure 2:
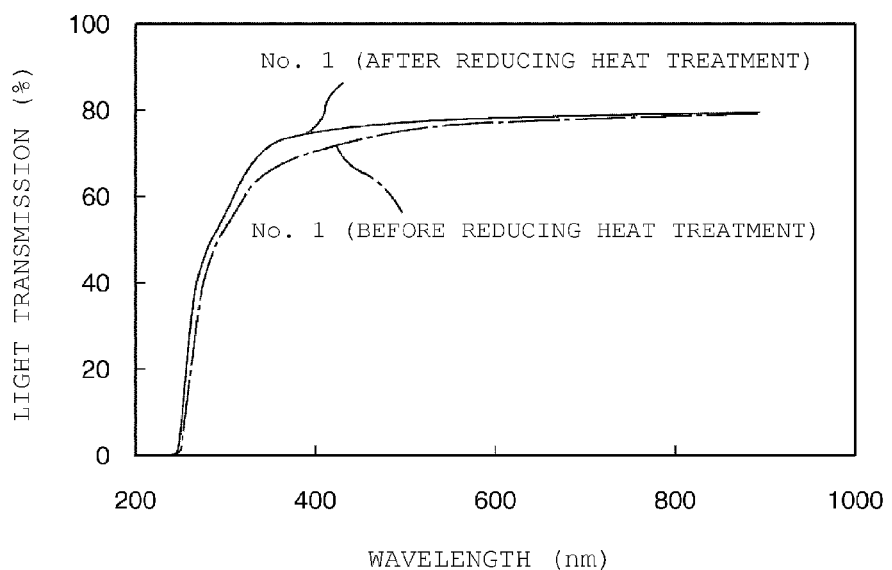
FIG. 2 is a graph illustrating the light transmission before a reducing heat treatment and the light transmission after the reducing heat treatment for evaluation sample No. 1.
Figure 3:
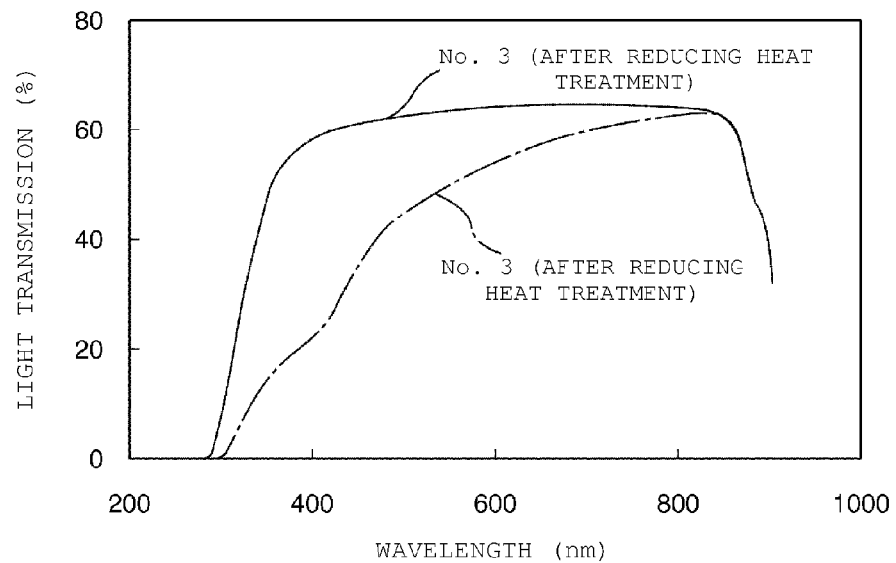
FIG. 3 is a graph illustrating the light transmission before a reducing heat treatment and the light transmission after the reducing heat treatment for evaluation sample No. 3.

Next, a measurement of the light transmission for the prepared evaluation samples 1 to 34 and the evaluation samples 1 to 34 before the heat treatment, was made with the use of a visible-ultraviolet spectrophotometer UV-2500PC from Shimadzu Corporation. The results thereof are shown in Tables 1 and 2 and FIGS. 2 and 3 below. It is to be noted that the light transmission curves illustrated in FIG. 2 indicate the light transmission before the heat treatment (dashed line) and the light transmission after the heat treatment (solid line) for sample No. 1. On the other hand, the light transmission curves illustrated in FIG. 3 show the light transmission before the heat treatment (dashed line) and the light transmission after the heat treatment (solid line) for the sample No. 3. The light transmissions shown in Tables 1 and 2 are in-line light transmissions at a wavelength of 450 nm.

For the prepared evaluation samples 1 to 8 and the evaluation samples 1 to 8 before the heat treatment, a spectrofluorometric measurement in the case of ultraviolet irradiation with the wavelength listed in Table 1 was made with the use of a fluorescence phosphorescence spectrophotometer FluoroMax-4P from Horiba, Ltd. The results are shown in Table 1 below. It is to be noted that the "Emission Wavelength" in Table 1 refers to a wavelength at which the emission intensity reaches the maximum. The "Emission Intensity" refers to the emission intensity at a wavelength at which the emission intensity reaches the maximum. In addition, the emission intensity illustrated in Table 1 has a normalized value with the assumption that the emission intensity of the evaluation sample 1 is regarded as 1.

Figure 4:
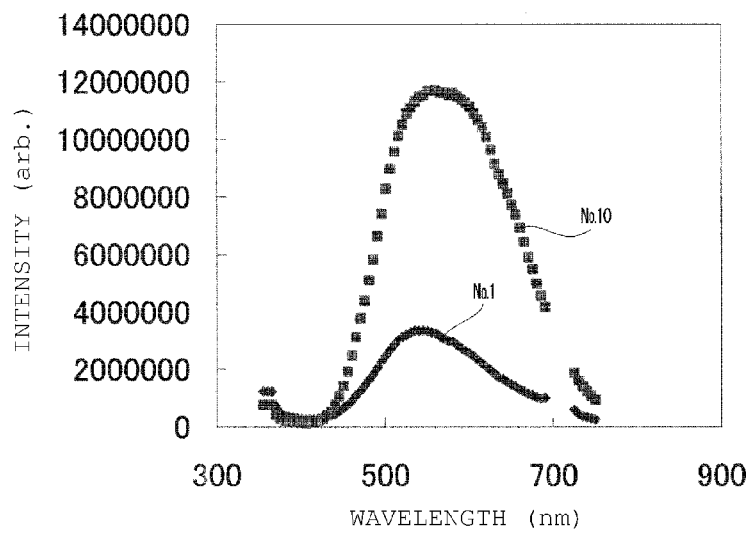
FIG. 4 is emission spectra in the case of irradiating each of evaluation samples Nos. 1 and 10 with ultraviolet light with a wavelength of 355 nm.

For the evaluation samples 1 and 10, an emission spectrum measurement in the case of ultraviolet irradiation with a wavelength of 355 nm as excitation light was made with the use of a fluorescence phosphorescence spectrophotometer FluoroMax-4P from Horiba, Ltd. The results are shown in FIG. 4.

For the evaluation samples 1 to 34, a measurement of the change in emission strength with time was made with the use of a fluorescence phosphorescence spectrophotometer FluoroMax-4P from Horiba, Ltd. It is to be noted that this measurement was made for the wavelength at which the highest-intensity emission was achieved in UV light irradiation. Specifically, the intensity of light with a wavelength of 555 nm was measured in the case of sample No. 1, with an excitation wavelength of 345 nm. In addition, as a comparison, the same measurement was made for a commercially available BGO single crystal (from Neotron Co., Ltd.). It is to be noted that in the case of the BGO single crystal, the intensity of light with a wavelength of 460 nm was measured with an excitation wavelength of 280 nm.

Figure 5:
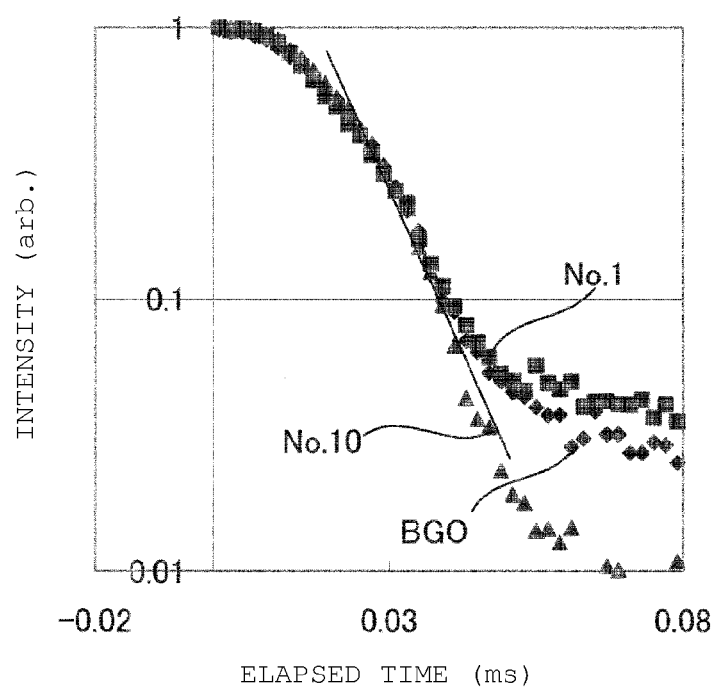
FIG. 5 is a graph representing the change in fluorescence emission intensity with time for evaluation samples Nos. 1 and 10 and a BGO single crystal.

FIG. 5 shows the measurement results for the evaluation samples Nos. 1 and 10 and the BGO single crystal. In the result shown in FIG. 5, the BGO single crystal has the same level of decay constant as those of the evaluation samples Nos. 1 and 10. Although not shown, measurement results for the decay constants of the other evaluation samples were also obtained at the same level as the decay constant of the BGO single crystal. However, the decay constant of the BGO single crystal is 300 nseconds, and the decay constant of 20 μseconds calculated from the measurement result shown in FIG. 5 is substantially longer than the actual decay constant. Accordingly, the apparatus used is considered to have a measurement limit of approximately 20 μseconds, and the decay constant for each evaluation sample is considered less than 20 μseconds.

Next, the quantum yield of the light emission in the case of ultraviolet light irradiation with a wavelength of 355 nm as excitation light for the prepared evaluation samples 1 to 34 and the evaluation samples 1 to 34 before the heat treatment was measured with the use of an absolute PL quantum yield measurement apparatus (C9920-02) from Hamamatsu Photonics K.K. In addition, for the BGO single crystal, the quantum yield of the light emission in the case of excitation light (ultraviolet light with a wavelength of 280 nm) irradiation was also measured in the same way. The measurement results are shown in Table 2 below.

TABLE 1

| Sample | Compositional Percentage | | | | | | | | Density ($g/cm^3$) | Transmission at Wavelength of 450 nm (%) | | Emission Wavelength (nm) | Emission Intensity | Decay Constant |
| | A | | | | | B | | | | Before Heat Treatment | After Heat Treatment | | | |
| | La | Yb | Lu | Gd | Y | Zr | Sn | Hf | | | | | | |
| 1 | 1.000 | | | | | 1.000 | | | 6.1 | 73.7 | 76.9 | 555 | 1.00 | less than 20μ seconds |
| 2 | 1.000 | | | | | | 1.000 | | 6.8 | 45.5 | 52.6 | 540 | 0.68 | less than 20μ seconds |
| 3 | 0.500 | 0.500 | | | | | | 1.000 | 8.9 | 35.0 | 61.2 | 575 | 0.14 | less than 20μ seconds |
| 4 | 0.500 | | 0.500 | | | 1.000 | | | 6.9 | 52.6 | 60.8 | 565 | 0.75 | less than 20μ seconds |
| 5 | 0.500 | | | 0.500 | | 1.000 | | | 6.3 | 31.3 | 43.4 | 555 | 0.81 | less than 20μ seconds |
| 6 | 0.500 | | | 0.500 | | 0.500 | | 0.500 | 7.5 | 55.9 | 61.2 | 535 | 0.45 | less than 20μ seconds |
| 7 | 0.900 | | | | 0.100 | 1.000 | | | 6.0 | 72.9 | 76.8 | 560 | 0.96 | less than 20μ seconds |
| 8 | | 0.200 | | 0.800 | | 0.500 | | 0.500 | 8.2 | 28.6 | 40.2 | 575 | 0.19 | less than 20μ seconds |

TABLE 2

| Sample | Compositional Percentage A | | | | | Compositional Percentage B | | | Density (g/cm³) | Transmission at Wavelength of 450 nm (%) Before Heat Treatment | Transmission at Wavelength of 450 nm (%) After Heat Treatment | Irradiation Wavelength (Excitation Wavelength) (nm) | Emission Quantum Yield (%) Before Heat Treatment | Emission Quantum Yield (%) After Heat Treatment | Decay Constant |
|---|---|---|---|---|---|---|---|---|---|---|---|---|---|---|---|
| | La | Yb | Lu | Gd | Y | Bi | Zr | Sn | Hf | | | | | | | |
| 1 | 1.000 | | | | | | 1.000 | | | 6.1 | 73.7 | 76.9 | 355 | 0.0 | 12.6 | less than 20μ seconds |
| 2 | 1.000 | | | | | | | 1.000 | | 6.8 | 45.5 | 52.6 | 355 | 0.0 | 8.4 | less than 20μ seconds |
| 3 | 0.500 | 0.500 | | | | | | | 1.000 | 8.9 | 35.0 | 61.2 | 355 | 0.0 | 3.2 | less than 20μ seconds |
| 4 | 0.500 | | 0.500 | | | | 1.000 | | | 6.9 | 52.6 | 60.8 | 355 | 0.0 | 8.6 | less than 20μ seconds |
| 5 | 0.500 | | | 0.500 | | | 1.000 | | | 6.3 | 31.3 | 43.4 | 355 | 0.0 | 8.4 | less than 20μ seconds |
| 6 | 0.500 | | | 0.500 | | | 0.500 | | 0.500 | 7.5 | 55.9 | 61.2 | 355 | 0.0 | 5.2 | less than 20μ seconds |
| 7 | 0.900 | | | | 0.100 | | 1.000 | | | 6.0 | 72.9 | 76.8 | 355 | 0.0 | 11.5 | less than 20μ seconds |
| 8 | | 0.200 | | 0.800 | | | 0.500 | | 0.500 | 8.2 | 28.6 | 40.2 | 355 | 0.0 | 3.1 | less than 20μ seconds |
| 9 | 0.999 | | | | | 0.001 | 1.000 | | | 6.1 | 74.9 | 76.9 | 355 | 0.3 | 25.6 | less than 20μ seconds |
| 10 | 0.990 | | | | | 0.001 | 1.000 | | | 6.1 | 75.1 | 77.0 | 355 | 0.4 | 38.6 | less than 20μ seconds |
| 11 | 0.970 | | | | | 0.030 | 1.000 | | | 6.2 | 73.2 | 75.3 | 355 | 0.2 | 39.7 | less than 20μ seconds |
| 12 | 0.950 | | | | | 0.050 | 1.000 | | | 6.2 | 65.4 | 72.1 | 355 | 0.1 | 24.3 | less than 20μ seconds |
| 13 | 0.999 | | | | | 0.001 | | 1.000 | | 6.8 | 53.1 | 62.4 | 355 | 0.1 | 20.4 | less than 20μ seconds |
| 14 | 0.990 | | | | | 0.010 | | 1.000 | | 6.8 | 55.3 | 65.3 | 355 | 0.2 | 22.1 | less than 20μ seconds |
| 15 | 0.970 | | | | | 0.030 | | 1.000 | | 6.9 | 56.7 | 66.3 | 355 | 0.1 | 22.4 | less than 20μ seconds |
| 16 | 0.950 | | | | | 0.050 | | 1.000 | | 6.9 | 48.9 | 55.2 | 355 | 0.1 | 17.3 | less than 20μ seconds |
| 17 | 0.999 | | | | | 0.001 | | | 1.000 | 8.6 | 50.5 | 71.2 | 355 | 0.0 | 17.5 | less than 20μ seconds |
| 18 | 0.990 | | | | | 0.010 | | | 1.000 | 8.6 | 51.4 | 70.3 | 355 | 0.1 | 26.6 | less than 20μ seconds |
| 19 | 0.970 | | | | | 0.030 | | | 1.000 | 8.7 | 52.6 | 71.5 | 355 | 0.1 | 24.2 | less than 20μ seconds |
| 20 | 0.950 | | | | | 0.050 | | | 1.000 | 8.7 | 52.5 | 70.2 | 355 | 0.0 | 18.6 | less than 20μ seconds |

TABLE 2-continued

| Sample | Compositional Percentage | | | | | | | | | Density (g/cm³) | Transmission at Wavelength of 450 nm (%) | | Irradiation Wavelength (Excitation Wavelength) (nm) | Emission Quantum Yield (%) | | Decay Constant |
| --- | --- | --- | --- | --- | --- | --- | --- | --- | --- | --- | --- | --- | --- | --- | --- | --- |
| | A | | | | | | B | | | | Before Heat Treatment | After Heat Treatment | | Before Heat Treatment | After Heat Treatment | |
| | La | Yb | Lu | Gd | Y | Bi | Zr | Sn | Hf | | | | | | | |
| 21 | 0.499 | | | 0.500 | | 0.001 | 0.500 | | 0.500 | 7.5 | 51.4 | 65.1 | 355 | 0.0 | 17.8 | less than 20μ seconds |
| 22 | 0.490 | | | 0.500 | | 0.010 | 0.500 | | 0.500 | 7.5 | 54.2 | 67.1 | 355 | 0.1 | 26.3 | less than 20μ seconds |
| 23 | 0.470 | | | 0.500 | | 0.030 | 0.500 | | 0.500 | 7.6 | 54.5 | 66.9 | 355 | 0.0 | 27.9 | less than 20μ seconds |
| 24 | 0.450 | | | 0.500 | | 0.050 | 0.500 | | 0.500 | 7.6 | 49.3 | 63.3 | 355 | 0.0 | 20.6 | less than 20μ seconds |
| 25 | | | | 0.999 | | 0.001 | | | 1.000 | 9.0 | 48.3 | 70.4 | 355 | 0.8 | 19.2 | less than 20μ seconds |
| 26 | | | | 0.990 | | 0.010 | | | 1.000 | 9.0 | 50.1 | 71.4 | 355 | 1.1 | 28.3 | less than 20μ seconds |
| 27 | | | | 0.970 | | 0.030 | | | 1.000 | 9.1 | 49.3 | 72.1 | 355 | 0.7 | 25.9 | less than 20μ seconds |
| 28 | | | | 0.950 | | 0.050 | | | 1.000 | 9.1 | 45.5 | 70.8 | 355 | 0.6 | 21.5 | less than 20μ seconds |
| 29 | 0.490 | 0.500 | | | | 0.010 | | | 1.000 | 8.9 | 40.4 | 68.3 | 355 | 0.0 | 21.1 | less than 20μ seconds |
| 30 | 0.490 | | 0.500 | | | 0.010 | 1.000 | | | 6.9 | 58.7 | 69.6 | 355 | 0.2 | 24.4 | less than 20μ seconds |
| 31 | 0.890 | | | | 0.100 | 0.010 | 1.000 | | | 6.1 | 73.1 | 75.5 | 355 | 0.2 | 31.5 | less than 20μ seconds |
| 32 | | 0.490 | | 0.500 | | 0.010 | 0.500 | | 0.500 | 8.2 | 38.4 | 48.4 | 355 | 0.1 | 23.3 | less than 20μ seconds |
| 33 | 0.490 | | 0.500 | | | 0.010 | 0.500 | 0.500 | | 7.4 | 47.2 | 50.7 | 355 | 0.1 | 17.2 | less than 20μ seconds |
| 34 | 0.490 | | | 0.500 | | 0.010 | 0.500 | 0.500 | | 7.3 | 48.5 | 57.4 | 355 | 0.1 | 16.4 | less than 20μ seconds |
| BGO | — | — | — | — | — | — | — | — | — | 7.1 | 75.1 | — | 280 | 17.8 | — | less than 20μ seconds |

As illustrated in Table 1 and Table 2, a light emission with a decay constant of 2 µseconds or less was observed by the ultraviolet light irradiation for all of evaluation samples Nos. 1 to 34. In consideration of the light emission observed by the ultraviolet light irradiation, light is also considered to be emitted in the case of delivery of radiation such as X ray or gamma ray which has higher energy than ultraviolet light.

In addition, the evaluation samples Nos. 1 to 34 all have a high density of 6 g/cm$^3$ or more.

For all of the evaluation samples Nos. 1 to 34, the increase in light transmission at the wavelength of 450 nm was observed by the reducing heat treatment, and the light transmission at the wavelength of 450 nm after the heat treatment was 40% or more. Above all, in the case of the evaluation samples 1, 7, 9 to 12, and 32 in which A includes at least one of La and Y and 0 to 5 mol % of Bi, and B is Zr, the evaluation samples 17 to 20 in which A includes La and 0.001 mol % to 5 mol % of Bi, and B includes Hf, and the evaluation samples 25 to 28 in which A includes Gd and 0.001 mol % to 5 mol % of Bi, and B includes Hf, a high light transmission of 70% or more was achieved.

In addition, from a comparison among the evaluation samples 1 and 9 to 12, a comparison among the evaluation samples 2 and 13 to 16, a comparison between the evaluation samples 3 and 29, a comparison between the evaluation samples 4 and 30, and a comparison between the evaluation samples 7 and 31, it is determined that the Bi contained in A can increase the emission quantum yield.

From a comparison among the evaluation samples 9 to 12, it is determined that in the case of A including La and Bi and B including Zr, a content rate of Bi in A within the range of 0.001 mol % to 0.03 mol % can increase the emission quantum yield.

From a comparison among the evaluation samples 13 to 16, it is determined that in the case of A including La and Bi and B including Sn, a content rate of Bi in A within the range of 0.001 mol % to 0.03 mol %, more preferably within the range of 0.01 mol % to 0.03 mol %, can increase the emission quantum yield.

From a comparison among the evaluation samples 18 to 20, it is determined that in the case of A including La and Bi and B including Hf, a content rate of Bi in A within the range of 0.01 mol % to 0.05 mol %, more preferably within the range of 0.01 mol % to 0.03 mol %, can increase the emission quantum yield.

From a comparison among the evaluation samples 21 to 24, it is determined that in the case of A including La, Gd, and Bi and B including Hf and Zr, a content rate of Bi in A within the range of 0.01 mol % to 0.05 mol %, more preferably within the range of 0.01 mol % to 0.03 mol %, can increase the emission quantum yield.

From a comparison among the evaluation samples 25 to 28, it is determined that in the case of A including Gd and Bi and B including Hf, the content rate of Bi in A within the range of 0.01 mol % to 0.05 mol %, more preferably within the range of 0.01 mol % to 0.03 mol % can increase the emission quantum yield.

In addition, it is determined that A including La and Bi and B including Zr are particularly preferable, from the standpoint of achieving a balance between a high emission quantum yield and a high light transmission.

DESCRIPTION OF REFERENCE SYMBOLS 1 scintillator
10 light emitting element
11 detector
12 radiation
13 light

The invention claimed is:

1. A light emitting ceramic comprising a reducing atmosphere heat treated ceramic containing, as its main constituent, a pyrochlore compound represented by $ABO_w$ in which A comprises at least one member selected from the group consisting of La, Y, Gd, Yb, and Lu, and 0 to 5 mol % of Bi; B is at least one member selected from the group consisting of Sn, Zr, and Hf; w is a positive number for maintaining electroneutrality, and the molar ratio of A/B is 0.95 to 1.05.

2. The light emitting ceramic according to claim 1, having a light transmission of 40% or more at a wavelength of 450 nm to 800 nm at a thickness of 1 mm.

3. The light emitting ceramic according to claim 1, having an emission quantum yield of 3% or more when the ceramic is irradiated with excitation light.

4. The light emitting ceramic according to claim 1, wherein A comprises at least one of La and Y, and 0 to 5 mol % of Bi, and B comprises Zr.

5. The light emitting ceramic according to claim 4, which at a thickness of 1 mm has a light transmission of 75% or more at a wavelength of 450 nm to 800 nm, and an emission quantum yield of 10% or more when the ceramic is irradiated with excitation light.

6. The light emitting ceramic according to claim 1, wherein A contains 0.001 mol % or more of Bi.

7. The light emitting ceramic according to claim 6, which has an emission quantum yield is 10% or more when the ceramic is irradiated with excitation light.

8. The light emitting ceramic according to claims 6, wherein A comprises La, and 0.001 mol % to 5 mol % of Bi, and B is at least one of Zr and Hf.

9. The light emitting ceramic according to claims 6, wherein A comprises Gd, and 0.001 mol % to 5 mol % of Bi, and B comprises Hf.

10. The light emitting ceramic according to claim 6, wherein the light emitting ceramic at 1 mm thickness has a light transmission of 70% or more at a wavelength of 450 nm to 800 nm, and an emission quantum yield is 15% or more when the ceramic is irradiated with excitation light.

11. A light emitting ceramic according to claim 1 in which A comprises at least one of La and Y, and 0 to 5 mol % of Bi; B comprises Zr; and at 1 mm in thickness has a light transmission of 75% or more at a wavelength of 450 nm to 800 nm.

12. The light emitting ceramic according to claim 11, which has an emission quantum yield is 10% or more when the ceramic is irradiated with excitation light.

13. A light emitting ceramic according to claim 1 in which A comprises La and 0.001 mol % to 5 mol % of Bi; B is at least one of Zr and Hf; and at 1 mm in thickness has a light transmission of 70% or more at a wavelength of 450 nm to 800 nm.

14. A light emitting ceramic according to claim 1 in which A comprises Gd and 0.001 mol % to 5 mol % of Bi; B is Hf; and at 1 mm in thickness has a light transmission of 70% or more at a wavelength of 450 nm to 800 nm.

15. The light emitting ceramic according to claim 1, which has an emission quantum yield of 15% or more when the ceramic is irradiated with excitation light and at 1 mm in thickness has a light transmission of 70% or more at a wavelength of 450 nm to 800 nm, in which A contains 0.001 mol % to 5 mol % of Bi, and in which A comprises La and B is at least one of Zr and Hf or A comprises Gd and B is Hf.

16. The light emitting ceramic according to claim 1, wherein the light emitting ceramic is a wavelength conversion ceramic which emits light of a longer wavelength than incident light.

17. The light emitting ceramic according to claim 16, wherein the light emitting ceramic emits visible light when ultraviolet light enters the ceramic.

18. The light emitting ceramic according to claim 1, wherein the light emitting ceramic is a radiation-to-light conversion ceramic which emits light when radiation enters the ceramic.

19. A light emitting element comprising the light emitting ceramic according to claim 1.

20. A scintillator comprising:
the light emitting element according to claim 19; and
a light detector for detecting light emitted from the light emitting element, and
wherein the light emitting ceramic is a radiation-to-light conversion ceramic which emits light when radiation enters the ceramic.

21. A method for producing a light emitting ceramic, comprising applying a heat treatment in a reducing atmosphere to a ceramic containing, as its main constituent, a pyrochlore compound represented by $ABO_w$ in which A comprises at least one member selected from the group consisting of La, Y, Gd, Yb, and Lu, and 0 to 5 mol % of Bi; B is at least one member selected from the group consisting of Sn, Zr, and Hf; w is a positive number for maintaining electroneutrality, and the molar ratio of A/B is 0.95 to 1.05.

22. The method for producing a light emitting ceramic according to claim 21, wherein A contains 0.001 mol % or more of Bi.

* * * * *